(12) United States Patent
Su et al.

(10) Patent No.: US 9,607,572 B2
(45) Date of Patent: Mar. 28, 2017

(54) INFORMATION PROCESSING METHOD AND ELECTRONIC DEVICE

(71) Applicant: Lenovo (Beijing) Co., Ltd., Beijing (CN)

(72) Inventors: Wei Su, Beijing (CN); Zhijun Gao, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 50 days.

(21) Appl. No.: 14/584,746

(22) Filed: Dec. 29, 2014

(65) Prior Publication Data

US 2016/0063944 A1    Mar. 3, 2016

(30) Foreign Application Priority Data

Sep. 1, 2014    (CN) .......................... 2014 1 0441311

(51) Int. Cl.
G09G 5/00 (2006.01)
G06F 1/16 (2006.01)
G06F 3/147 (2006.01)

(52) U.S. Cl.
CPC .............. *G09G 5/00* (2013.01); *G06F 1/163* (2013.01); *G06F 1/1637* (2013.01); *G06F 3/147* (2013.01); *G09G 2330/021* (2013.01); *G09G 2330/022* (2013.01); *G09G 2370/22* (2013.01)

(58) Field of Classification Search
CPC ...... G06F 3/017; G06F 1/1616; G06F 1/1624; G06F 1/163; G06F 1/1637; G06F 1/1656; G06F 1/166; G06F 1/1681; G06F 2203/04101; G06F 2203/04806; G06F 2203/04808; G06F 3/0412; G06F 3/04842; G06F 3/04847; G06F 3/1423; G06F 3/167; E05D 11/082; E05D 2011/085; E05D 3/12; E05D 3/122; E05F 5/02; E05Y 2900/606;
(Continued)

(56) References Cited

U.S. PATENT DOCUMENTS 8,381,135 B2    2/2013 Hotelling
2006/0161870 A1*    7/2006 Hotelling .............. G06F 3/0485
715/863

(Continued)

OTHER PUBLICATIONS

Office Action dated Sep. 8, 2015 issued by the German Patent Office for the corresponding German Patent Application No. 102014019646.1 (18 pages including English translation).

*Primary Examiner* — Kenneth Bukowski
(74) *Attorney, Agent, or Firm* — Brinks Gilson & Lione; G. Peter Nichols

(57) ABSTRACT

An information processing method and an electronic device are described. The method includes acquiring a first sensing parameter through a first sensor; determining whether the first sensing parameter satisfies a first predetermined condition, the first predetermined condition being a distance threshold of a distance between an object that operates the electronic device and a display output area to which a display unit of the first display module of the electronic device corresponds; generating a first control instruction when the first sensing parameter satisfies the first predetermined condition; and controlling the first display module to switch from a first state to a second state based on the first control instruction.

12 Claims, 7 Drawing Sheets

(58) Field of Classification Search
CPC ... F16C 11/04; G04G 17/02; G09G 2330/021; G09G 5/00
See application file for complete search history.

(56) References Cited

U.S. PATENT DOCUMENTS

| | | | |
|---|---|---|---|
| 2008/0199165 A1* | 8/2008 | Ng .................... | G03B 17/00 396/51 |
| 2011/0012796 A1* | 1/2011 | Kim .................. | H01Q 1/273 343/702 |
| 2013/0328616 A1* | 12/2013 | Buttolo ............. | H03K 17/955 327/517 |

* cited by examiner

INFORMATION PROCESSING METHOD AND ELECTRONIC DEVICE

This application claims priority to Chinese patent application No. 201410441311.1 filed on Sep. 1, 2014, the entire contents of which are incorporated herein by reference.

BACKGROUND

The present application relates to terminal technique in the field of information processing, and particularly, to an information processing method and an electronic device.

Currently, electronic devices, especially intelligent terminals, such as smart phones, smart watches, are used by a growing number of users. When using an electronic device, with smart phone as example, the display screen of the smart phone will turn off as the user approaches (including contacts) the smart phone, for example, during a call, the display screen automatically turns off when the user's mobile phone contacts an ear and/or face. However, this approach may sometimes cause inconvenience to the user, which affects user experience.

SUMMARY

It is provided an information processing method applied to an electronic device that includes a first display module. The method comprises acquiring a first sensing parameter through a first sensor; determining whether the first sensing parameter satisfies a first predetermined condition, the first predetermined condition being a distance threshold of a distance between an object that operates the electronic device and a display output area to which a display unit of the first display module of the electronic device corresponds; generating a first control instruction when the first sensing parameter satisfies the first predetermined condition; controlling the first display module to switch from a first state to a second state based on the first control instruction; wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

BRIEF DESCRIPTION OF THE DRAWINGS

Hereinafter, the present application will be further described in detail in conjunction with the accompanying drawings and the specific embodiments.

First Embodiment

Figure 1:
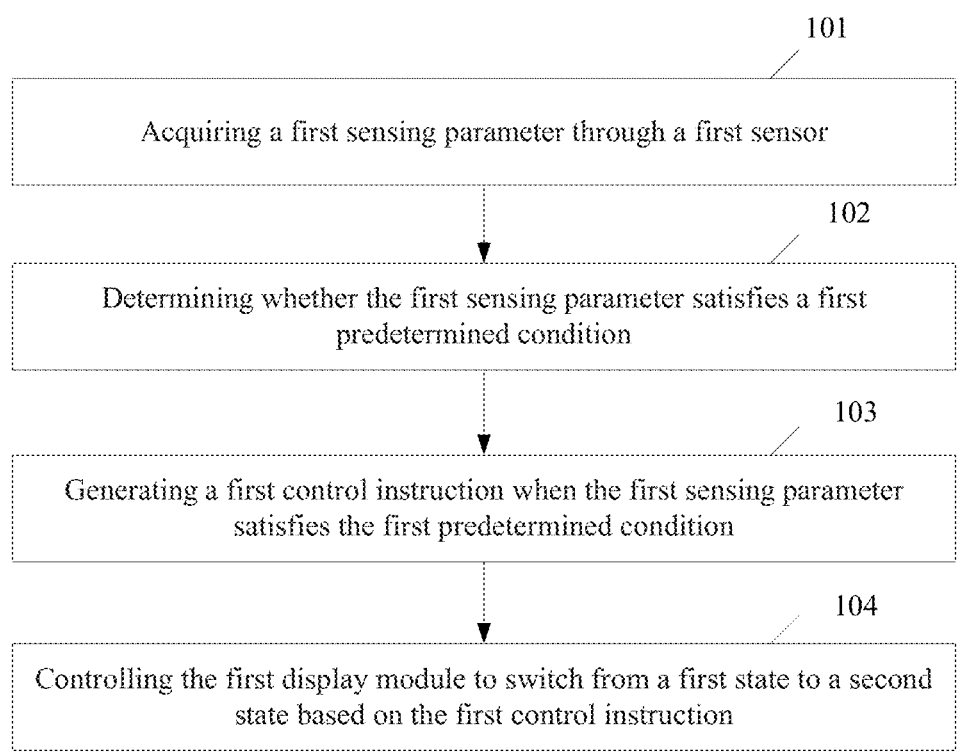
FIG. 1 is a first schematic diagram of flows of the information processing method according to an embodiment of the present application.

The embodiment of the present application provides an information processing method applied to an electronic device that includes a first display module, as shown in FIG. 1, the method comprises: Step 101: acquiring a first sensing parameter through a first sensor; Step 102: determining whether the first sensing parameter satisfies a first predetermined condition, the first predetermined condition being a distance threshold of a distance between an object that operates the electronic device and a display output area to which a display unit of the first display module of the electronic device corresponds; Step 103: generating a first control instruction when the first sensing parameter satisfies the first predetermined condition; Step 104: controlling the first display module to switch from a first state to a second state based on the first control instruction; wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart watch. The first sensor may be an infrared sensor. The first sensing parameter may be: when the first sensor is an infrared sensor, the first sensing parameter may be a distance parameter between an object that operates the electronic device and a display unit of the first display module. The distance threshold may be a value preset according to a practical situation, for example, it may be 0, which shows the object that operates the electronic device and the display unit of the first display module are in a contacted state; or it may be 0.5 to 2 cm, which shows the object that operates the electronic device and the display unit of the first display module are in a close state. The object that operates the electronic device may be finger of the user, eyes of the user, or head of the user.

One implementing scenario of this embodiment may be: acquiring a first sensing parameter through an infrared sensor when the user is using a smart phone and his/her finger contacts the display unit; determining whether the first sensing parameter satisfies a first predetermined condition, that is, whether a distance between the finger of the user and the display unit of the smart phone is within a distance threshold; generating a first control instruction when the first sensing parameter satisfies the first predetermined condition, and lightening the display unit of the first display module based on the first control instruction.

Accordingly, by means of adopting the above solution, the display unit can be lightened when the distance between the object that operates the electronic device and the display unit is within the distance threshold. In this way, the user can rapidly lighten the display unit, and thereby operate the electronic device, which enhances using experience of the user.

Second Embodiment

Figure 2:
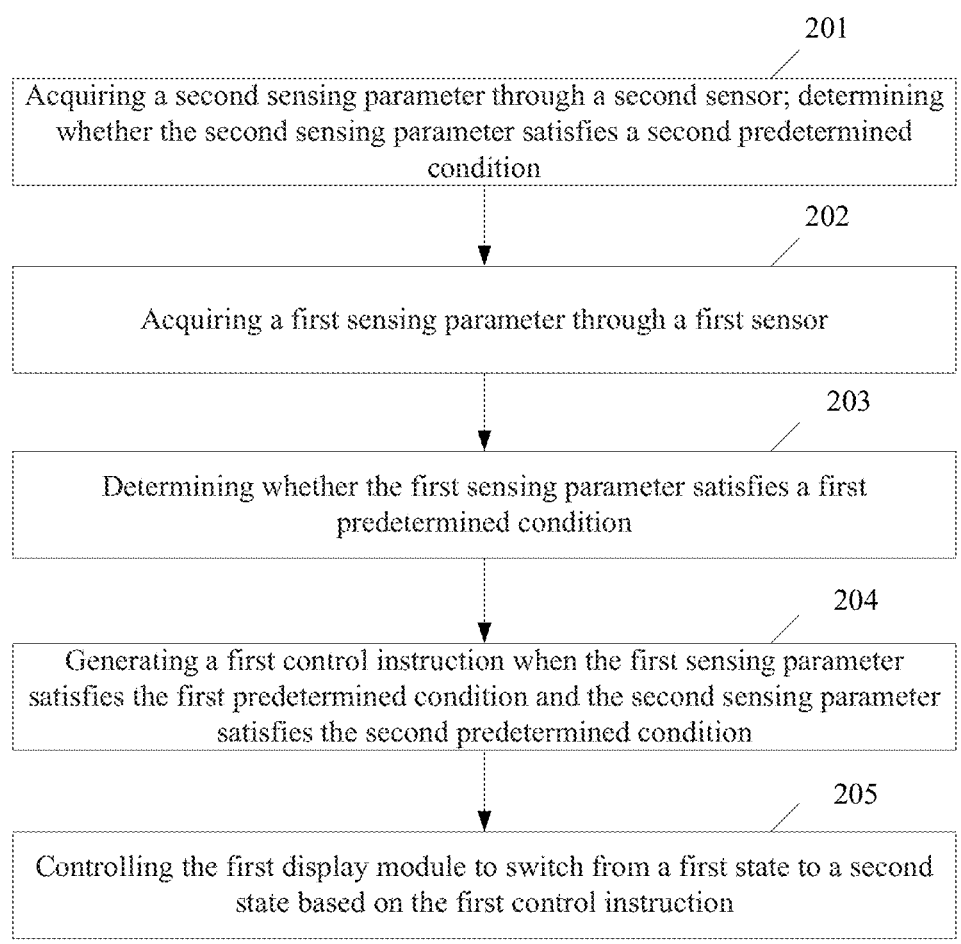
FIG. 2 is a second schematic diagram of flows of the information processing method according to an embodiment of the present application.

The embodiment of the present application provides an information processing method applied to an electronic device that includes a first display module, as shown in FIG. 2, the method comprises: Step 201: acquiring a second sensing parameter through a second sensor; determining whether the second sensing parameter satisfies a second predetermined condition, the second predetermined condition being whether the object that operates on the display output area to which the display unit corresponds belongs to a first operating body; the second sensing parameter may be a variety, like time, whether a threshold of 30 seconds is reached; Step 202: acquiring a first sensing parameter through a first sensor; Step 203: determining whether the first sensing parameter satisfies a first predetermined condition, the first predetermined condition being a distance threshold of a distance between an object that operates the electronic device and a display output area to which a display unit of the first display module of the electronic device corresponds; Step 204: generating a first control instruction when the first sensing parameter satisfies the first predetermined condition and the second sensing parameter satisfies the second predetermined condition; Step 205: controlling the first display module to switch from a first state to a second state based on the first control instruction; wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart watch.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state; or it may be 0.5 to 2 cm, which shows the object that operates the electronic device and the display unit of the first display module are in a close state.

The object that operates the electronic device may be finger of the user, eyes of the user, or head of the user.

The above second sensor may be a touch screen, then the second sensing parameter may be a touch period.

Correspondingly, the second predetermined condition may be: determining whether the object that operates on the display output area to which the display unit corresponds belongs to a first operating body by judging whether the touch period reaches a predetermined threshold, which may be 10 seconds; for example, when the user needs to lighten the display unit, he/she may touch any position in the display output area of the display unit, if the period reaches 10 seconds, then it is determined that the object that operates the display unit is the first operating body, that is, the finger of the user.

The above display output area may be a specified area, for example, it may be specified that the first operating body needs to operate on the intermediate area of the smart phone.

Alternatively, the above second sensor may be a temperature sensor, then the second sensing parameter is a temperature parameter.

Correspondingly, determining whether the second sensing parameter satisfies a second predetermined condition may be: determining whether the object that operates on the display output area to which the display unit corresponds belongs to a first operating body by judging whether the second sensing parameter reaches a predetermined temperature threshold. For example, the basic human body temperature is between 35 to 40 degrees, so the predetermined temperature threshold may be 35 to 40 degrees, when the second sensor detects that the temperature of the first operating body is 36 degrees, then it is determined that the second sensing parameter satisfies the second predetermined condition.

In this way, it is possible to further determine whether the operation comes from the first operating body by determining whether the second sensing parameter satisfies the second predetermined condition, thereby it is ensured that the possibility of occurrence of a misjudgment is reduced.

There is no particular order and priority to execute the above step 201 and step 202, for example, step 202 may be executed first, and thereafter step 201 is executed, that is, first acquiring the first sensing parameter of the first sensor and thereafter acquiring the second sensing parameter of the second sensor.

An implementation scenario of this embodiment will be described below:

First scenario: in the case where the second sensor is a temperature sensor, and the first sensor is an infrared sensor A second sensing parameter, i.e., a temperature parameter, is acquired through the temperature sensor, it is determined whether the temperature parameter satisfies a predetermined temperature threshold, i.e., 35 to 40 degrees, when the temperature parameter satisfies the predetermined temperature threshold, then it is determined that the second sensing parameter satisfies the second predetermined condition, i.e., it is determined that the object that operates on the display output area of the display unit is the first operating body, wherein in this embodiment, it is assumed that the first operating body is a finger of the user.

Thereafter, a first sensing parameter is acquired through the infrared sensor; it is determined whether the first sensing parameter satisfies the first predetermined condition, i.e., whether a distance between the finger of the user and the display unit of the smart phone is within a distance threshold.

Again, when the first sensing parameter satisfies the first predetermined condition and the second sensing parameter satisfies the second predetermined condition, a first control instruction is generated, and the display unit of the first display mode is lightened based on the first control instruction.

Second scenario: in the case where the second sensor is a touch sensor, i.e., a touch screen, and the first sensor is an infrared sensor A second sensing parameter, i.e., a touch period parameter, is acquired through the touch screen, it is determined whether the touch period parameter satisfies a predetermined period, i.e., more than 10 seconds, when satisfied, then it is determined that the second sensing parameter satisfies the second predetermined condition, i.e., it is determined that the object that operates on the display output area of the display unit is the first operating body, wherein in this embodiment, it is assumed that the first operating body is a finger of the user.

Thereafter, a first sensing parameter is acquired through the infrared sensor; it is determined whether the first sensing parameter satisfies the first predetermined condition, i.e., whether a distance between the finger of the user and the display unit of the smart phone is within a distance threshold.

Again, when the first sensing parameter satisfies the first predetermined condition and the second sensing parameter satisfies the second predetermined condition, a first control instruction is generated, and the display unit of the first display mode is lightened based on the first control instruction.

Third scenario: in the case where the second sensor is a touch sensor, i.e., a touch screen, and the first sensor is an infrared sensor First, a first sensing parameter is acquired through the infrared sensor; it is determined whether the first sensing parameter satisfies the first predetermined condition, i.e., whether a distance between the finger of the user and the display unit of the smart phone is within a distance threshold.

Thereafter, a second sensing parameter, i.e., a touch period parameter, is acquired through the touch screen, it is determined whether the touch period parameter satisfies a predetermined period, i.e., more than 10 seconds, when satisfied, then it is determined that the second sensing parameter satisfies the second predetermined condition, i.e., it is determined that the object that operates on the display output area of the display unit is the first operating body, wherein in this embodiment, it is assumed that the first operating body is a finger of the user.

When the first sensing parameter satisfies the first predetermined condition and the second sensing parameter satisfies the second predetermined condition, a first control instruction is generated, and the display unit of the first display mode is lightened based on the first control instruction.

As will be appreciated, in this scenario, only the example of the second sensor being a touch sensor is provided, in practical application, the second sensor in this scenario may be a temperature sensor, it using manner is the same as that in the first scenario, no more details repeated here.

Fourth scenario: in the case where the second sensor is a temperature sensor, and the first sensor is an infrared sensor First, a first sensing parameter is acquired through the infrared sensor; it is determined whether the first sensing parameter satisfies the first predetermined condition, i.e., whether a distance between the finger of the user and the display unit of the smart phone is within a distance threshold; meanwhile, a second sensing parameter, i.e., a temperature parameter, is acquired through the temperature sensor, when the temperature parameter satisfies the predetermined temperature threshold, then it is determined that the second sensing parameter satisfies the second predetermined condition, i.e., it is determined that the object that operates on the display output area of the display unit is the first operating body, wherein in this embodiment, it is assumed that the first operating body is a finger of the user.

Next, when the first sensing parameter satisfies the first predetermined condition and the second sensing parameter satisfies the second predetermined condition, a first control instruction is generated, and the display unit of the first display mode is lightened based on the first control instruction.

Accordingly, by means of adopting the above solution, it is possible to determine that a distance between the object that operates the electronic device and the display unit is within a distance threshold with the first sensing parameter acquired through the first sensor, and in addition, it is also possible to determine that the object that operates the electronic device is the first operating body with the second sensing parameter acquired through the second sensor, and the display unit is lightened when the two conditions are both satisfied concurrently. In this way, the user can rapidly lighten the display unit and avoid an error operation, thereby operate the electronic device, which enhances using experience of the user.

Third Embodiment

The embodiment of the present application provides an information processing method applied to an electronic device that includes a first display module, as shown in FIG. 2, the method comprises: Step 201: acquiring a second sensing parameter through a second sensor; determining whether the second sensing parameter satisfies a second predetermined condition, the second predetermined condition being whether the object that operates on the display output area to which the display unit corresponds belongs to a first operating body; the second sensing parameter may be a variety, like time, whether a threshold of 30 seconds is reached; Step 202: acquiring a first sensing parameter through a first sensor; Step 203: determining whether the first sensing parameter satisfies a first predetermined condition, the first predetermined condition being a distance threshold of a distance between an object that operates the electronic device and a display output area to which a display unit of the first display module of the electronic device corresponds; Step 204: generating a first control instruction when the first sensing parameter satisfies the first predetermined condition and the second sensing parameter satisfies the second predetermined condition; Step 205: controlling the first display module to switch from a first state to a second state based on the first control instruction; wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart watch.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state; or it may be 0.5 to 2 cm, which shows the object that operates the electronic device and the display unit of the first display module are in a close state.

The object that operates the electronic device may be finger of the user, eyes of the user, or head of the user.

There is no particular order and priority to execute the above step 201 and step 202, for example, step 202 may be executed first, and thereafter step 201 is executed, that is, first acquiring the first sensing parameter of the first sensor and thereafter acquiring the second sensing parameter of the second sensor.

The second sensor may be a sensor for sensing gesture, and is configured to acquire a motion of a second operating body that wears or holds the electronic device. As will be appreciated, when the electronic device is a smart phone, the second operating body may be a hand that holds the smart phone; when the electronic device is a smart ring, the second operating body may be a finger that wears the smart ring; when the electronic device is smart watch, the second operating body may a wrist that wears the smart watch.

Acquiring a second sensing parameter through a second sensor comprises: acquiring a motion parameter of the second operating body that wears or holds the electronic device through the second sensor as the second sensing parameter.

Correspondingly, determining whether the second sensing parameter satisfies a second predetermined condition based on the second sensing parameter comprises: determining the object in front of the display output area as the first operating body when the motion parameter of the second operating body represents that the second operating body moves from a first relative position to a second relative position.

Hereinafter, description is provided with the electronic device being a smart watch as example.

Figure 3A:
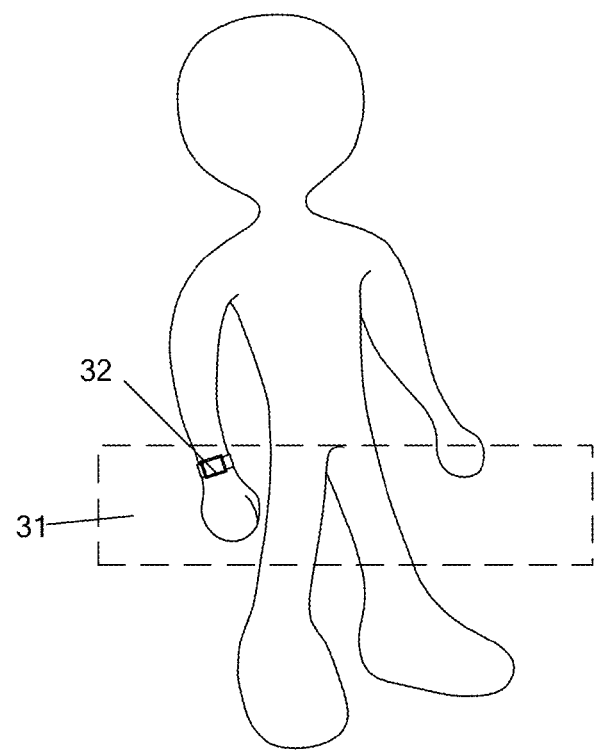
FIG. 3*a* is a first schematic diagram of a scenario of implementation of an embodiment of the present application.
Figure 3B:
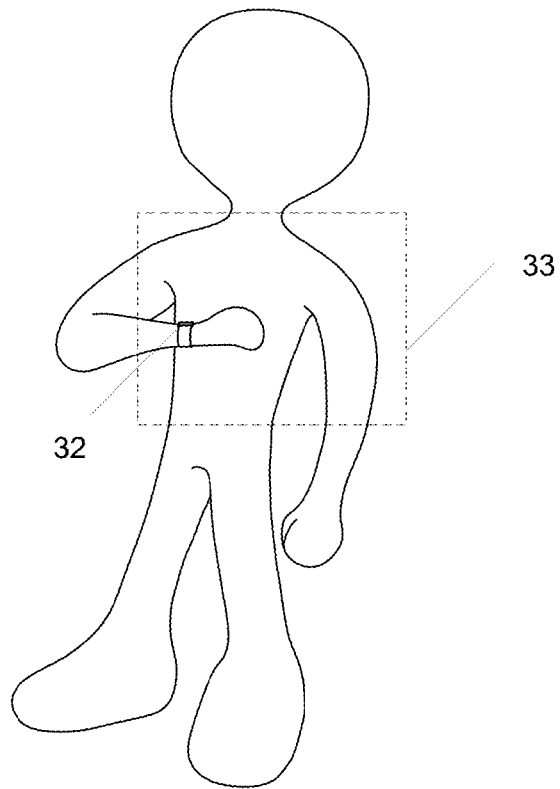
FIG. 3*b* is a second schematic diagram of a scenario of implementation of an embodiment of the present application.

As shown in FIGS. 3a and 3b, the smart phone 32 worn by the user first is located in a first relative position 31 as shown in FIG. 3a, then when the user needs to watch content in the smart watch 32, the user raises the arm to a second relative position 33, then according to the user's action, it can be determined that it is the first operating body that operates on the display unit of the smart watch. Alternatively, when the user's arm raises to the second relative position 34 as shown in FIG. 3c, it is determined that it is the first operating body that operates the smart watch.

Figure 3C:
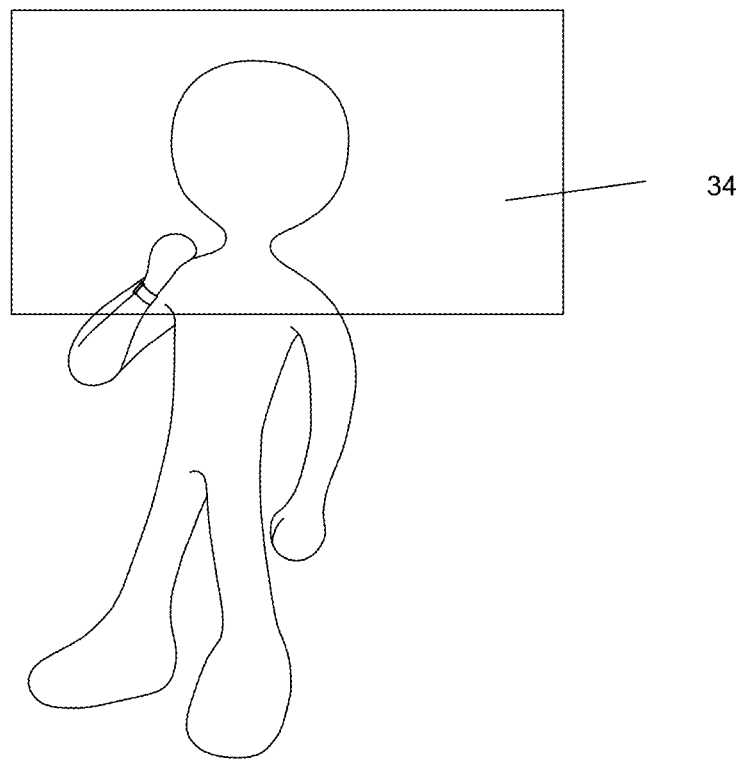
FIG. 3*c* is a third schematic diagram of a scenario of implementation of an embodiment of the present application.

As will be appreciated, although the above FIGS. 3a and 3b and 3c only schematically show the smart watch, it may be replaced with a smart phone or a smart ring in practical application.

Further, determining the object in front of the display output area as the first operating body when the motion parameter of the second operating body represents that the second operating body moves from a first relative position to a second relative position comprises: initiating the first sensor when the motion parameter of the second operating body represents that the second operating body moves from a first relative position to a second relative position, and determining the object in front of the display output area as the first operating body when the first sensing parameter is sensed through the first sensor.

For example, when the first relative position is a side of the user's body, the second relative position is in front of the user' chest, and the electronic device is a smart phone, when the second sensor detects the motion parameter, which represents that the user moves the smart phone from the first relative position to the second relative position, the first sensor is initiated, i.e., step 202 is executed, in this case, it is determined what is acquired by the first sensor is the first sensing parameter generated by the first operating body when step 202 is executed, wherein the first operating body may be the user's finger.

As will be appreciated, when the electronic device is a smart watch, when it is determined that the smart watch moves from the first relative position to the second relative position, for example, the position as shown in FIG. 3c, the first sensor is initiated, and it is determined that what is acquired by the first parameter is the first sensing parameter generated by the user's eyes.

In this way, in addition to avoiding error operation, it is also possible to determine the first operating body of the user at a specified position, this improves the operating efficiency and accuracy of the electronic device.

Accordingly, by means of adopting the above solution, it is possible to determine that a distance between the object that operates the electronic device and the display unit is within a distance threshold with the first sensing parameter acquired through the first sensor, and in addition, it is also possible to determine that the object that operates the electronic device is the first operating body with the second sensing parameter acquired through the second sensor, and the display unit is lightened when the two conditions are both satisfied concurrently. In this way, the user can rapidly lighten the display unit and avoid an error operation, thereby operate the electronic device, which enhances using experience of the user.

Fourth Embodiment

The embodiment of the present application provides an information processing method applied to an electronic device that includes a first display module, as shown in FIG. 1, the method comprises: Step 101: acquiring a first sensing parameter through a first sensor; Step 102: determining whether the first sensing parameter satisfies a first predetermined condition, the first predetermined condition being a distance threshold of a distance between an object that operates the electronic device and a display output area to which a display unit of the first display module of the electronic device corresponds; Step 103: generating a first control instruction when the first sensing parameter satisfies the first predetermined condition; Step 104: controlling the first display module to switch from a first state to a second state based on the first control instruction; wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart watch.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state.

The first predetermined condition is: a distance interval of a distance between an object that operates the electronic device and a display output area to which a display unit of the first display module of the electronic device corresponds, the distance interval including a first distance threshold at a start position of the distance interval and a second distance threshold at an end position of the distance interval, the first distance threshold being smaller than the second distance threshold. For example, the first distance threshold may be 0.5 cm, the second distance threshold may be 5 cm.

Figure 4:
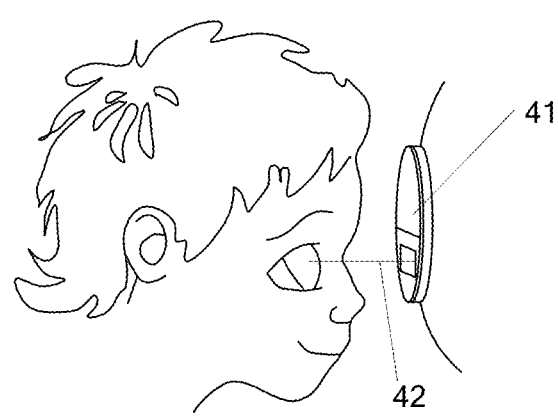
FIG. 4 is a schematic diagram of a using scenario of the present application.

A sensing range of the first sensor is a first distance value that includes the distance interval. For example, when the electronic device is a smart watch 41, as shown in FIG. 4, the first distance value may be a distance 42. The first distance value is smaller than the second distance threshold and larger than the first distance threshold.

Correspondingly, determining whether the first sensing parameter satisfies a first predetermined condition comprises: generating a first control instruction when the first sensing parameter is within the distance interval so as to control the first display module to switch from a first state to a second state; controlling the first display module to maintain in the first state when the first sensing parameter is smaller than the first distance threshold; as such, when the user places the electronic device within a bag or a pocket, other objects may contact the electronic device, by defining the distance threshold, it causes the electronic device to avoid a startup due to misoperation; for example, when the user is using the electronic device, his/her eyes will not contact the electronic device, a certain distance must be kept, however, the clothes or bag will certainly be close to contact the surface of the electronic device, thus by the determination of distance threshold provided in this embodiment, an error determination caused by an error contact can be avoided; controlling the first display module to maintain in the first state when the first sensing parameter is greater than the second distance threshold.

The object that operates the electronic device may be finger of the user, eyes of the user, or head of the user.

One implementing scenario of this embodiment may be:

First scenario: acquiring a first sensing parameter through an infrared sensor when the user is using a smart phone and his/her finger contacts the display unit; determining whether the first sensing parameter satisfies a first predetermined condition, that is, whether a distance between the finger of the user and the display unit of the smart phone is within a distance threshold; generating a first control instruction when the first sensing parameter satisfies the first predetermined condition, and lightening the display unit of the first display module based on the first control instruction.

Second scenario: acquiring a first sensing parameter through an infrared sensor when the user is using a smart phone or a smart watch;

determining whether the first sensing parameter satisfies a first predetermined condition, that is, a distance between the finger or eyes of the user and the display unit of the smart phone is acquired, when the distance is smaller than the second distance threshold and larger than the second distance threshold, it is within a preset distance interval; generating a first control instruction when the first sensing parameter satisfies the first predetermined condition, and lightening the display unit of the first display module based on the first control instruction.

Accordingly, by means of adopting the above solution, the display unit can be lightened when the distance between the object that operates the electronic device and the display unit is within the distance threshold. In this way, the user can rapidly lighten the display unit, and thereby operate the electronic device, which enhances using experience of the user.

Fifth Embodiment

The embodiment of the present application provides an information processing method applied to an electronic device that includes a first display module, as shown in FIG. 1, the method comprises: Step 101: acquiring a first sensing parameter through a first sensor; Step 102: determining whether the first sensing parameter satisfies a first predetermined condition, the first predetermined condition being a distance threshold of a distance between an object that operates the electronic device and a display output area to which a display unit of the first display module of the electronic device corresponds; Step 103: generating a first control instruction when the first sensing parameter satisfies the first predetermined condition; Step 104: controlling the first display module to switch from a first state to a second state based on the first control instruction; wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart watch.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state.

The first predetermined condition is: a distance interval of a distance between an object that operates the electronic device and a display output area to which a display unit of the first display module of the electronic device corresponds, the distance interval including a first distance threshold at a start position of the distance interval and a second distance threshold at an end position of the distance interval, the first distance threshold being smaller than the second distance threshold. For example, the first distance threshold may be 0.5 cm, the second distance threshold may be 5 cm.

A sensing range of the first sensor is a first distance value that includes the distance interval. For example, when the electronic device is a smart watch 41, as shown in FIG. 4, the first distance value may be a distance 42. The first distance value is smaller than the second distance threshold and larger than the first distance threshold.

Correspondingly, determining whether the first sensing parameter satisfies a first predetermined condition comprises: generating a first control instruction when the first sensing parameter is within the distance interval so as to control the first display module to switch from a first state to a second state; controlling the first display module to maintain in the first state when the first sensing parameter is smaller than the first distance threshold; as such, when the user places the electronic device within a bag or a pocket, other objects may contact the electronic device, by defining the distance threshold, it causes the electronic device to avoid a startup due to misoperation; for example, when the user is using the electronic device, his/her eyes will not contact the electronic device, a certain distance must be kept, however, the clothes or bag will certainly be close to contact the surface of the electronic device, thus by the determination of distance threshold provided in this embodiment, an error determination caused by an error contact can be avoided; controlling the first display module to maintain in the first state when the first sensing parameter is greater than the second distance threshold.

The object that operates the electronic device may be finger of the user, eyes of the user, or head of the user.

Before or while executing step 101, the method may further comprise: acquiring a second sensing parameter through a second sensor; determining whether the second sensing parameter satisfies a second predetermined condition, the second predetermined condition being whether the object that operates on the display output area to which the display unit corresponds belongs to a first operating body; the second sensing parameter may be a variety, like time, whether a threshold of 30 seconds is reached. Then step 103 and step 104 correspondingly are: generating a first control instruction when the first sensing parameter satisfies the first predetermined condition and the second sensing parameter satisfies the second predetermined condition; controlling the first display module to switch from a first state to a second state based on the first control instruction; wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

The second sensor may be a sensor for sensing gesture, and is configured to acquire a motion of a second operating body that wears or holds the electronic device. As will be appreciated, when the electronic device is a smart phone, the second operating body may be a hand that holds the smart phone; when the electronic device is a smart ring, the second operating body may be a finger that wears the smart ring; when the electronic device is smart watch, the second operating body may a wrist that wears the smart watch.

Acquiring a second sensing parameter through a second sensor comprises: acquiring a motion parameter of the second operating body that wears or holds the electronic device through the second sensor as the second sensing parameter.

Correspondingly, determining whether the second sensing parameter satisfies a second predetermined condition based on the second sensing parameter comprises: determining the object in front of the display output area as the first operating body when the motion parameter of the second operating body represents that the second operating body moves from a first relative position to a second relative position.

Further, determining the object in front of the display output area as the first operating body when the motion parameter of the second operating body represents that the second operating body moves from a first relative position to a second relative position may comprise: initiating the first sensor when the motion parameter of the second operating body represents that the second operating body moves from a first relative position to a second relative position, and determining the object in front of the display output area as the first operating body when the first sensing parameter is sensed through the first sensor.

In this way, in addition to avoiding error operation, it is also possible to determine the first operating body of the user at a specified position, this improves the operating efficiency and accuracy of the electronic device.

Figure 5:
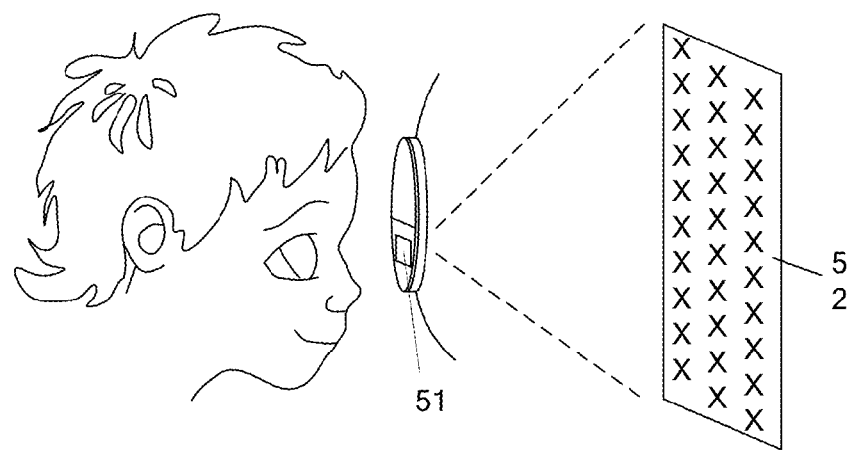
FIG. 5 is a schematic diagram of an image perceived by a user in an embodiment of the present application.

When the electronic device is a smart watch, after the above step 104 is completed, the following may be further comprised: as shown in FIG. 5, generating a startup instruction when the first display module is in the displaying-operating state; controlling to lighten the display unit of the first display module based on the startup instruction, light beam emitted by the display unit transmits through the display output area 51 and is incident to eyes of a user, which serves as the first operating body, so that the user perceives a picture 52, a size of the picture is larger than a size of the display output area; the electronic device may further include a second display module, display principle of the second display module is different than that of the first display module; the second display module includes a first operating state and a second operating state; wherein the first operating state is a low-power-consumption state of the second display module, at least a display unit of the second display module is not lightened when the second display module is in the low-power-consumption state, the second operating state is a displaying-operating state of the second display module, the display unit of the second display module is lightened when the second display module is in the displaying-operating state; correspondingly, controlling the first display module to switch from a first state to a second state based on the first control instruction comprises: controlling the first display module to switch from the first state to the second state based on the first control instruction, while controlling the second display module to switch from the second operating state to the first operating state.

Figure 6:
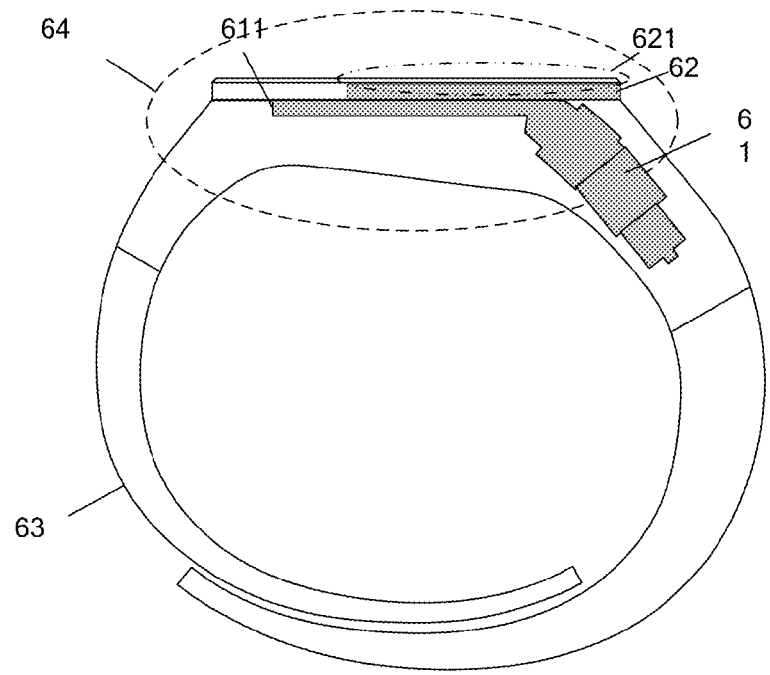
FIG. 6 is a structural schematic diagram of side view of the electronic device according to an embodiment of the present application.

The above electronic device including two display modules may be a smart swatch, its structure may be as shown in FIG. 6, the first display module 61 and the second display module 62; wherein display principle of the first display module 61 is different than that of the second display module 62; the first display module 61 has a first display area 611; the second display module 62 has a second display area 621; due to different display principles of the first display module and the second module, the first interaction manner that the user uses the first display module of the electronic device and the second interaction manner that the user uses the second display module of the electronic device are different; the second interaction manner is a viewing manner that the user's eyes are away from the first display output area on the electronic device; the first interaction manner is a viewing manner that the user's eyes approaches the second display output area on the electronic device; when the user approaches the second display output area on the electronic device in the second interaction manner, a light beam emitted by the second display module is incident to the user's eyes, so that the user perceives the second perceived image; size of the second perceived image is larger than that of the second display output area.

Accordingly, by means of adopting the above solution, it is possible to determine that a distance between the object that operates the electronic device and the display unit is within a distance threshold with the first sensing parameter acquired through the first sensor, and in addition, it is also possible to determine that the object that operates the electronic device is the first operating body with the second sensing parameter acquired through the second sensor, and the display unit is lightened when the two conditions are both satisfied concurrently. In this way, the user can rapidly lighten the display unit and avoid an error operation, thereby operate the electronic device, which enhances using experience of the user.

Sixth Embodiment

Figure 7:
FIG. 7 is a first structural schematic diagram of the electronic device according to an embodiment of the present application.

The embodiment of the present application provides an electronic device, as shown in FIG. 7, the electronic device comprises: a first sensor 71 configured to acquire a first sensing parameter; an information processing unit 72 configured to determine whether the first sensing parameter satisfies a first predetermined condition, the first predetermined condition being a distance threshold of a distance between an object that operates the electronic device and a display output area to which a display unit of the first display module of the electronic device corresponds; generate a first control instruction when the first sensing parameter satisfies the first predetermined condition; and control the first display module to switch from a first state to a second state based on the first control instruction, wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart ring.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state; or it may be 0.5 to 2 cm, which shows the object that operates the electronic device and the display unit of the first display module are in a close state.

The object that operates the electronic device may be finger of the user, eyes of the user, or head of the user.

One implementing scenario of this embodiment may be: acquiring a first sensing parameter through an infrared sensor when the user is using a smart phone and his/her finger contacts the display unit; determining whether the first sensing parameter satisfies a first predetermined condition, that is, whether a distance between the finger of the user and the display unit of the smart phone is within a distance threshold; generating a first control instruction when the first sensing parameter satisfies the first predetermined condition, and lightening the display unit of the first display module based on the first control instruction.

Accordingly, by means of adopting the above solution, the display unit can be lightened when the distance between the object that operates the electronic device and the display unit is within the distance threshold. In this way, the user can rapidly lighten the display unit, and thereby operate the electronic device, which enhances using experience of the user.

Seventh Embodiment

Figure 8:
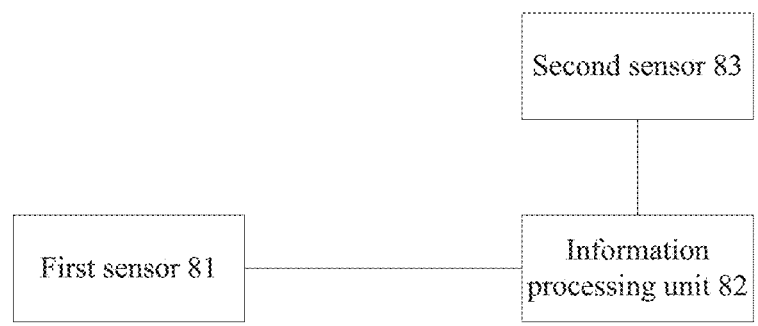
FIG. 8 is a second structural schematic diagram of the electronic device according to an embodiment of the present application.

The embodiment of the present application provides an electronic device, as shown in FIG. 8, the electronic device comprises: a first sensor 81 configured to acquire a first sensing parameter; an information processing unit 82 configured to determine whether the first sensing parameter satisfies a first predetermined condition, the first predetermined condition being a distance threshold of a distance between an object that operates the electronic device and a display output area to which a display unit of the first display module of the electronic device corresponds; generate a first control instruction when the first sensing parameter satisfies the first predetermined condition; and control the first display module to switch from a first state to a second state based on the first control instruction, wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

The electronic device further comprises: a second sensor 83 configured to acquire a second sensing parameter; correspondingly, the information processing unit 82 is further configured to determine whether the second sensing parameter satisfies a second predetermined condition, the second predetermined condition being whether the object that operates on the display output area to which the display unit corresponds belongs to a first operating body; and generate a first control instruction when the first sensing parameter satisfies the first predetermined condition and the second sensing parameter satisfies the second predetermined condition.

Herein, the electronic device may be a smart phone.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state; or it may be 0.5 to 2 cm, which shows the object that operates the electronic device and the display unit of the first display module are in a close state.

The object that operates the electronic device may be finger of the user, eyes of the user, or head of the user.

The above second sensor may be a touch screen, then the second sensing parameter may be a touch period.

Correspondingly, the second predetermined condition may be: determining whether the object that operates on the display output area to which the display unit corresponds belongs to a first operating body by judging whether the touch period reaches a predetermined threshold, which may be 10 seconds; for example, when the user needs to lighten the display unit, he/she may touch any position in the display output area of the display unit, if the period reaches 10 seconds, then it is determined that the object that operates the display unit is the first operating body, that is, the finger of the user.

The above display output area may be a specified area, for example, it may be specified that the first operating body needs to operate on the intermediate area of the smart phone.

Alternatively, the above second sensor may be a temperature sensor, then the second sensing parameter is a temperature parameter.

The information processing unit is configured in particular to determine whether the object that operates on the display output area to which the display unit corresponds belongs to a first operating by judging whether the second sensing parameter satisfies the second predetermined condition. For example, the basic human body temperature is between 35 to 40 degrees, so the predetermined temperature threshold may be 35 to 40 degrees, when the second sensor detects that the temperature of the first operating body is 36 degrees, then it is determined that the second sensing parameter satisfies the second predetermined condition.

In this way, it is possible to further determine whether the operation comes from the first operating body by determining whether the second sensing parameter satisfies the second predetermined condition, thereby it is ensured that the possibility of occurrence of a misjudgment is reduced.

There is no particular order and priority to execute the above operations of determining whether the second sensing parameter satisfies the second predetermined condition and determining whether the first sensing parameter satisfies the first predetermined condition, for example, it is allowed to first acquire the first sensing parameter of the first sensor and thereafter acquire the second sensing parameter of the second sensor; or alternatively, it is also possible to acquire and determine the first sensing parameter, and acquire and determine the second sensing parameter concurrently.

An implementation scenario of this embodiment will be described below:

First scenario: in the case where the second sensor is a temperature sensor, and the first sensor is an infrared sensor A second sensing parameter, i.e., a temperature parameter, is acquired through the temperature sensor, it is determined whether the temperature parameter satisfies a predetermined temperature threshold, i.e., 35 to 40 degrees, when the temperature parameter satisfies the predetermined temperature threshold, then it is determined that the second sensing parameter satisfies the second predetermined condition, i.e., it is determined that the object that operates on the display output area of the display unit is the first operating body, wherein in this embodiment, it is assumed that the first operating body is a finger of the user.

Thereafter, a first sensing parameter is acquired through the infrared sensor; it is determined whether the first sensing parameter satisfies the first predetermined condition, i.e., whether a distance between the finger of the user and the display unit of the smart phone is within a distance threshold.

Again, when the first sensing parameter satisfies the first predetermined condition and the second sensing parameter satisfies the second predetermined condition, a first control instruction is generated, and the display unit of the first display mode is lightened based on the first control instruction.

Second scenario: in the case where the second sensor is a touch sensor, i.e., a touch screen, and the first sensor is an infrared sensor A second sensing parameter, i.e., a touch period parameter, is acquired through the touch screen, it is determined whether the touch period parameter satisfies a predetermined period, i.e., more than 10 seconds, when satisfied, then it is determined that the second sensing parameter satisfies the second predetermined condition, i.e., it is determined that the object that operates on the display output area of the display unit is the first operating body, wherein in this embodiment, it is assumed that the first operating body is a finger of the user.

Thereafter, a first sensing parameter is acquired through the infrared sensor; it is determined whether the first sensing parameter satisfies the first predetermined condition, i.e., whether a distance between the finger of the user and the display unit of the smart phone is within a distance threshold.

Again, when the first sensing parameter satisfies the first predetermined condition and the second sensing parameter satisfies the second predetermined condition, a first control instruction is generated, and the display unit of the first display mode is lightened based on the first control instruction.

Third scenario: in the case where the second sensor is a touch sensor, i.e., a touch screen, and the first sensor is an infrared sensor First, a first sensing parameter is acquired through the infrared sensor; it is determined whether the first sensing parameter satisfies the first predetermined condition, i.e., whether a distance between the finger of the user and the display unit of the smart phone is within a distance threshold;

Thereafter, a second sensing parameter, i.e., a touch period parameter, is acquired through the touch screen, it is determined whether the touch period parameter satisfies a predetermined period, i.e., more than 10 seconds, when satisfied, then it is determined that the second sensing parameter satisfies the second predetermined condition, i.e., it is determined that the object that operates on the display output area of the display unit is the first operating body, wherein in this embodiment, it is assumed that the first operating body is a finger of the user.

When the first sensing parameter satisfies the first predetermined condition and the second sensing parameter satisfies the second predetermined condition, a first control instruction is generated, and the display unit of the first display mode is lightened based on the first control instruction.

As will be appreciated, in this scenario, only the example of the second sensor being a touch sensor is provided, in practical application, the second sensor in this scenario may be a temperature sensor, it using manner is the same as that in the first scenario, no more details repeated here.

Fourth scenario: in the case where the second sensor is a temperature sensor, and the first sensor is an infrared sensor First, a first sensing parameter is acquired through the infrared sensor; it is determined whether the first sensing parameter satisfies the first predetermined condition, i.e., whether a distance between the finger of the user and the display unit of the smart phone is within a distance threshold; meanwhile, a second sensing parameter, i.e., a temperature parameter, is acquired through the temperature sensor, when the temperature parameter satisfies the predetermined temperature threshold, then it is determined that the second sensing parameter satisfies the second predetermined condition, i.e., it is determined that the object that operates on the display output area of the display unit is the first operating body, wherein in this embodiment, it is assumed that the first operating body is a finger of the user.

Next, when the first sensing parameter satisfies the first predetermined condition and the second sensing parameter satisfies the second predetermined condition, a first control instruction is generated, and the display unit of the first display mode is lightened based on the first control instruction.

Accordingly, by means of adopting the above solution, it is possible to determine that a distance between the object that operates the electronic device and the display unit is within a distance threshold with the first sensing parameter acquired through the first sensor, and in addition, it is also possible to determine that the object that operates the electronic device is the first operating body with the second sensing parameter acquired through the second sensor, and the display unit is lightened when the two conditions are both satisfied concurrently. In this way, the user can rapidly lighten the display unit and avoid an error operation, thereby operate the electronic device, which enhances using experience of the user.

Eighth Embodiment

The embodiment of the present application provides an electronic device, as shown in FIG. 8, the electronic device comprises: a first sensor 81 configured to acquire a first sensing parameter; an information processing unit 82 configured to determine whether the first sensing parameter satisfies a first predetermined condition, the first predetermined condition being a distance threshold of a distance between an object that operates the electronic device and a display output area to which a display unit of the first display module of the electronic device corresponds; generate a first control instruction when the first sensing parameter satisfies the first predetermined condition; and control the first display module to switch from a first state to a second state based on the first control instruction, wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

The electronic device further comprises: a second sensor 83 configured to acquire a second sensing parameter; correspondingly, the information processing unit 82 is further configured to determine whether the second sensing parameter satisfies a second predetermined condition, the second predetermined condition being whether the object that operates on the display output area to which the display unit corresponds belongs to a first operating body; and generate a first control instruction when the first sensing parameter satisfies the first predetermined condition and the second sensing parameter satisfies the second predetermined condition.

Herein, the electronic device may be a smart phone.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state; or it may be 0.5 to 2 cm, which shows the object that operates the electronic device and the display unit of the first display module are in a close state.

The object that operates the electronic device may be finger of the user, eyes of the user, or head of the user.

The above second sensor may be a touch screen, then the second sensing parameter may be a touch period.

Correspondingly, the second predetermined condition may be: determining whether the object that operates on the display output area to which the display unit corresponds belongs to a first operating body by judging whether the touch period reaches a predetermined threshold, which may be 10 seconds; for example, when the user needs to lighten the display unit, he/she may touch any position in the display output area of the display unit, if the period reaches 10 seconds, then it is determined that the object that operates the display unit is the first operating body, that is, the finger of the user.

The above display output area may be a specified area, for example, it may be specified that the first operating body needs to operate on the intermediate area of the smart phone.

Alternatively, the above second sensor may be a temperature sensor, then the second sensing parameter is a temperature parameter.

The information processing unit is configured in particular to determine whether the object that operates on the display output area to which the display unit corresponds belongs to a first operating by judging whether the second sensing parameter satisfies the second predetermined condition. For example, the basic human body temperature is between 35 to 40 degrees, so the predetermined temperature threshold may be 35 to 40 degrees, when the second sensor detects that the temperature of the first operating body is 36 degrees, then it is determined that the second sensing parameter satisfies the second predetermined condition.

In this way, it is possible to further determine whether the operation comes from the first operating body by determining whether the second sensing parameter satisfies the second predetermined condition, thereby it is ensured that the possibility of occurrence of a misjudgment is reduced.

There is no particular order and priority to execute the above operations of determining whether the second sensing parameter satisfies the second predetermined condition and determining whether the first sensing parameter satisfies the first predetermined condition, for example, it is allowed to first acquire the first sensing parameter of the first sensor and thereafter acquire the second sensing parameter of the second sensor; or alternatively, it is also possible to acquire and determine the first sensing parameter, and acquire and determine the second sensing parameter concurrently.

The second sensor is a sensor for sensing gesture, and is configured in particular to acquire a motion of a second operating body that wears or holds the electronic device; and acquire a second sensing parameter through a second sensor comprises: acquiring a motion parameter of the second operating body that wears or holds the electronic device through the second sensor as the second sensing parameter; correspondingly, the information processing unit is configured in particular to determine the object in front of the display output area as the first operating body when the motion parameter of the second operating body represents that the second operating body moves from a first relative position to a second relative position. As will be appreciated, when the electronic device is a smart phone, the second operating body may be a hand that holds the smart phone; when the electronic device is a smart ring, the second operating body may be a finger that wears the smart ring;

when the electronic device is smart watch, the second operating body may a wrist that wears the smart watch Hereinafter, description is provided with the electronic device being a smart watch as example.

As shown in FIGS. 3a and 3b, the smart phone 32 worn by the user first is located in a first relative position 31 as shown in FIG. 3a, then when the user needs to watch content in the smart watch 32, the user raises the arm to a second relative position 33, then according to the user's action, it can be determined that it is the first operating body that operates on the display unit of the smart watch. Alternatively, when the user's arm raises to the second relative position 34 as shown in FIG. 3c, it is determined that it is the first operating body that operates the smart watch.

As will be appreciated, although the above FIGS. 3a and 3b and 3c only schematically show the smart watch, it may be replaced with a smart phone or a smart ring in practical application.

Further, the information processing unit is configured in particular to determine the object in front of the display output area as the first operating body in the case that the first sensor is initiated and the first sensing parameter is sensed through the first sensor when the motion parameter of the second operating body represents that the second operating body moves from a first relative position to a second relative position.

For example, when the first relative position is a side of the user's body, the second relative position is in front of the user' chest, and the electronic device is a smart phone, when the second sensor detects the motion parameter, which represents that the user moves the smart phone from the first relative position to the second relative position, the first sensor is initiated, i.e., step 202 is executed, in this case, it is determined what is acquired by the first sensor is the first sensing parameter generated by the first operating body when step 202 is executed, wherein the first operating body may be the user's finger.

As will be appreciated, when the electronic device is a smart watch, when it is determined that the smart watch moves from the first relative position to the second relative position, for example, the position as shown in FIG. 3c, the first sensor is initiated, and it is determined that what is acquired by the first parameter is the first sensing parameter generated by the user's eyes.

In this way, in addition to avoiding error operation, it is also possible to determine the first operating body of the user at a specified position, this improves the operating efficiency and accuracy of the electronic device.

Accordingly, by means of adopting the above solution, it is possible to determine that a distance between the object that operates the electronic device and the display unit is within a distance threshold with the first sensing parameter acquired through the first sensor, and in addition, it is also possible to determine that the object that operates the electronic device is the first operating body with the second sensing parameter acquired through the second sensor, and the display unit is lightened when the two conditions are both satisfied concurrently. In this way, the user can rapidly lighten the display unit and avoid an error operation, thereby operate the electronic device, which enhances using experience of the user.

Ninth Embodiment

The embodiment of the present application provides an electronic device, the electronic device comprises: a first sensor configured to acquire a first sensing parameter; an information processing unit configured to determine whether the first sensing parameter satisfies a first predetermined condition, the first predetermined condition being a distance threshold of a distance between an object that operates the electronic device and a display output area to which a display unit of the first display module of the electronic device corresponds; generate a first control instruction when the first sensing parameter satisfies the first predetermined condition; and control the first display module to switch from a first state to a second state based on the first control instruction, wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart watch.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state.

The first predetermined condition is: a distance interval of a distance between an object that operates the electronic device and a display output area to which a display unit of the first display module of the electronic device corresponds, the distance interval including a first distance threshold at a start position of the distance interval and a second distance threshold at an end position of the distance interval, the first distance threshold being smaller than the second distance threshold. For example, the first distance threshold may be 0.5 cm, the second distance threshold may be 5 cm.

A sensing range of the first sensor is a first distance value that includes the distance interval. For example, when the electronic device is a smart watch 41, as shown in FIG. 4, the first distance value may be a distance 42. The first distance value is smaller than the second distance threshold and larger than the first distance threshold.

The information processing unit is further configured to generate a first control instruction when the first sensing parameter is within the distance interval so as to control the first display module to switch from a first state to a second state; control the first display module to maintain in the first state when the first sensing parameter is smaller than the first distance threshold; and control the first display module to maintain in the first state when the first sensing parameter is greater than the second distance threshold. the first predetermined condition is: a distance interval of a distance between an object that operates the electronic device and a display output area to which a display unit of the first display module of the electronic device corresponds, the distance interval including a first distance threshold at a start position of the distance interval and a second distance threshold at an end position of the distance interval, the first distance threshold being smaller than the second distance threshold; a sensing range of the first sensor is a first distance value that includes the distance interval; for example, when the user is using the electronic device, his/her eyes will not contact the electronic device, a certain distance must be kept, however, the clothes or bag will certainly be close to contact the surface of the electronic device, thus by the determination of distance threshold provided in this embodiment, an error determination caused by an error contact can be avoided; controlling the first display module to maintain in the first state when the first sensing parameter is greater than the second distance threshold.

The object that operates the electronic device may be finger of the user, eyes of the user, or head of the user.

One implementing scenario of this embodiment may be:

First scenario: acquiring a first sensing parameter through an infrared sensor when the user is using a smart phone and his/her finger contacts the display unit; determining whether the first sensing parameter satisfies a first predetermined condition, that is, whether a distance between the finger of the user and the display unit of the smart phone is within a distance threshold; generating a first control instruction when the first sensing parameter satisfies the first predetermined condition, and lightening the display unit of the first display module based on the first control instruction.

Second scenario: acquiring a first sensing parameter through an infrared sensor when the user is using a smart phone or a smart watch; determining whether the first sensing parameter satisfies a first predetermined condition, that is, a distance between the finger or eyes of the user and the display unit of the smart phone is acquired, when the distance is smaller than the second distance threshold and larger than the second distance threshold, it is within a preset distance interval; generating a first control instruction when the first sensing parameter satisfies the first predetermined condition, and lightening the display unit of the first display module based on the first control instruction.

Accordingly, by means of adopting the above solution, the display unit can be lightened when the distance between the object that operates the electronic device and the display unit is within the distance threshold. In this way, the user can rapidly lighten the display unit, and thereby operate the electronic device, which enhances using experience of the user.

Tenth Embodiment

The embodiment of the present application provides an electronic device, the electronic device comprises: a first sensor configured to acquire a first sensing parameter; an information processing unit configured to determine whether the first sensing parameter satisfies a first predetermined condition, the first predetermined condition being a distance threshold of a distance between an object that operates the electronic device and a display output area to which a display unit of the first display module of the electronic device corresponds; generate a first control instruction when the first sensing parameter satisfies the first predetermined condition; and control the first display module to switch from a first state to a second state based on the first control instruction, wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state.

Herein, the electronic device may be a smart phone or a smart watch.

The first sensor may be an infrared sensor.

The first sensing parameter may be: when the first sensor is an infrared sensor, the first sensing parameter may be a distance parameter between an object that operates the electronic device and a display unit of the first display module.

The distance threshold may be a value preset according to a practical situation, for example, it may be 0, which shows the object that operates the electronic device and the display unit of the first display module are in a contacted state.

The first predetermined condition is: a distance interval of a distance between an object that operates the electronic device and a display output area to which a display unit of the first display module of the electronic device corresponds, the distance interval including a first distance threshold at a start position of the distance interval and a second distance threshold at an end position of the distance interval, the first distance threshold being smaller than the second distance threshold. For example, the first distance threshold may be 0.5 cm, the second distance threshold may be 5 cm.

A sensing range of the first sensor is a first distance value that includes the distance interval. For example, when the electronic device is a smart watch 41, as shown in FIG. 4, the first distance value may be a distance 42. The first distance value is smaller than the second distance threshold and larger than the first distance threshold.

Correspondingly, determining whether the first sensing parameter satisfies a first predetermined condition comprises: generating a first control instruction when the first sensing parameter is within the distance interval so as to control the first display module to switch from a first state to a second state; controlling the first display module to maintain in the first state when the first sensing parameter is smaller than the first distance threshold; as such, when the user places the electronic device within a bag or a pocket, other objects may contact the electronic device, by defining the distance threshold, it causes the electronic device to avoid a startup due to misoperation; for example, when the user is using the electronic device, his/her eyes will not contact the electronic device, a certain distance must be kept, however, the clothes or bag will certainly be close to contact the surface of the electronic device, thus by the determination of distance threshold provided in this embodiment, an error determination caused by an error contact can be avoided; controlling the first display module to maintain in the first state when the first sensing parameter is greater than the second distance threshold.

The object that operates the electronic device may be finger of the user, eyes of the user, or head of the user.

The electronic device further comprises: a second sensor configured to acquire a second sensing parameter; correspondingly, the information processing unit is further configured to determine whether the second sensing parameter satisfies a second predetermined condition, the second predetermined condition being whether the object that operates on the display output area to which the display unit corresponds belongs to a first operating body; and generate a first control instruction when the first sensing parameter satisfies the first predetermined condition and the second sensing parameter satisfies the second predetermined condition; the second sensor is a sensor for sensing gesture, and is configured in particular to acquire a motion of a second operating body that wears or holds the electronic device; and acquire a second sensing parameter through a second sensor comprises: acquiring a motion parameter of the second operating body that wears or holds the electronic device through the second sensor as the second sensing parameter; correspondingly, the information processing unit is configured in particular to determine the object in front of the display output area as the first operating body when the motion parameter of the second operating body represents that the second operating body moves from a first relative position to a second relative position.

As will be appreciated, when the electronic device is a smart phone, the second operating body may be a hand that holds the smart phone; when the electronic device is a smart ring, the second operating body may be a finger that wears the smart ring; when the electronic device is smart watch, the second operating body may a wrist that wears the smart watch.

Further, the information processing unit is configured in particular to initiate the first sensor when the motion parameter of the second operating body represents that the second operating body moves from a first relative position to a second relative position, and determine the object in front of the display output area as the first operating body when the first sensing parameter is sensed through the first sensor.

In this way, in addition to avoiding error operation, it is also possible to determine the first operating body of the user at a specified position, this improves the operating efficiency and accuracy of the electronic device.

When the electronic device is a smart watch, as shown in FIG. 6, the electronic device further comprises: a frame body 64, a fixing device 63, and a functional main section; the fixing device is connected with the frame body and configured to fix the electronic device to a support body, and the frame body and the fixing device form an annular space when the electronic device is fixed to the support body by the fixing device; the functional main section includes a display device provided within the frame body and having a first display area and a second display area, the first display area being larger than the second display area; wherein the display device includes a first display module configured to form a display output area corresponding to the display area on an outer surface of the frame body when content is displayed in the display area, and generate a startup instruction when the first display module is in the displaying-operating state; correspondingly, the information processing unit is further configured to control to lighten the display unit of the first display module based on the startup instruction, light beam emitted by the display unit transmits through the display output area and is incident to eyes of a user, which serves as the first operating body, so that the user perceives a picture, a size of the picture is larger than a size of the display output area.

The electronic device may further comprise a second display module, display principle of the second display module is different than that of the first display module; the second display module includes a first operating state and a second operating state; wherein the first operating state is a low-power-consumption state of the second display module, at least a display unit of the second display module is not lightened when the second display module is in the low-power-consumption state, the second operating state is a displaying-operating state of the second display module, the display unit of the second display module is lightened when the second display module is in the displaying-operating state; correspondingly, the information processing unit is further configured to control the first display module to switch from the first state to the second state based on the first control instruction, while controlling the second display module to switch from the second operating state to the first operating state.

The above electronic device including two display modules may be a smart swatch, its structure may be as shown in FIG. 6, the first display module 61 and the second display module 62; the first display module 61 has a first display area 611; the second display module 62 has a second display area 621; due to different display principles of the first display module 61 and the second module 62, the first interaction manner that the user uses the first display module of the electronic device and the second interaction manner that the user uses the second display module of the electronic device are different; the second interaction manner is a viewing manner that the user's eyes are away from the first display output area on the electronic device; the first interaction manner is a viewing manner that the user's eyes approaches the second display output area on the electronic device; when the user approaches the second display output area on the electronic device in the second interaction manner, a light beam emitted by the second display module is incident to the user's eyes, so that the user perceives the second perceived image; size of the second perceived image is larger than that of the second display output area.

Figure 9:
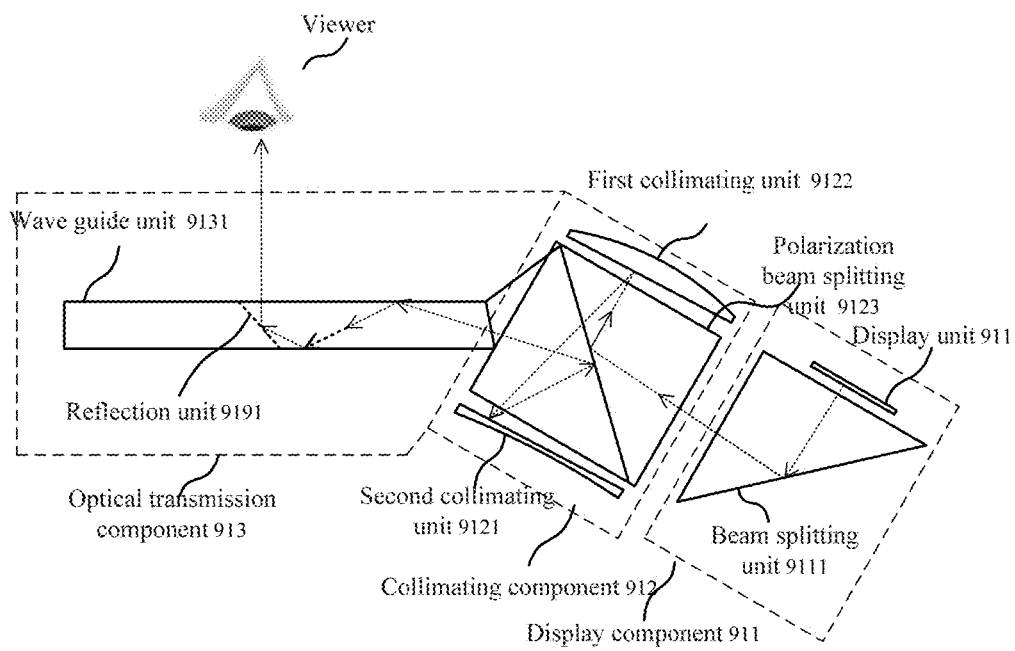
FIG. 9 is a first structural schematic diagram of the first display module according to an embodiment of the present application.
Figure 10:
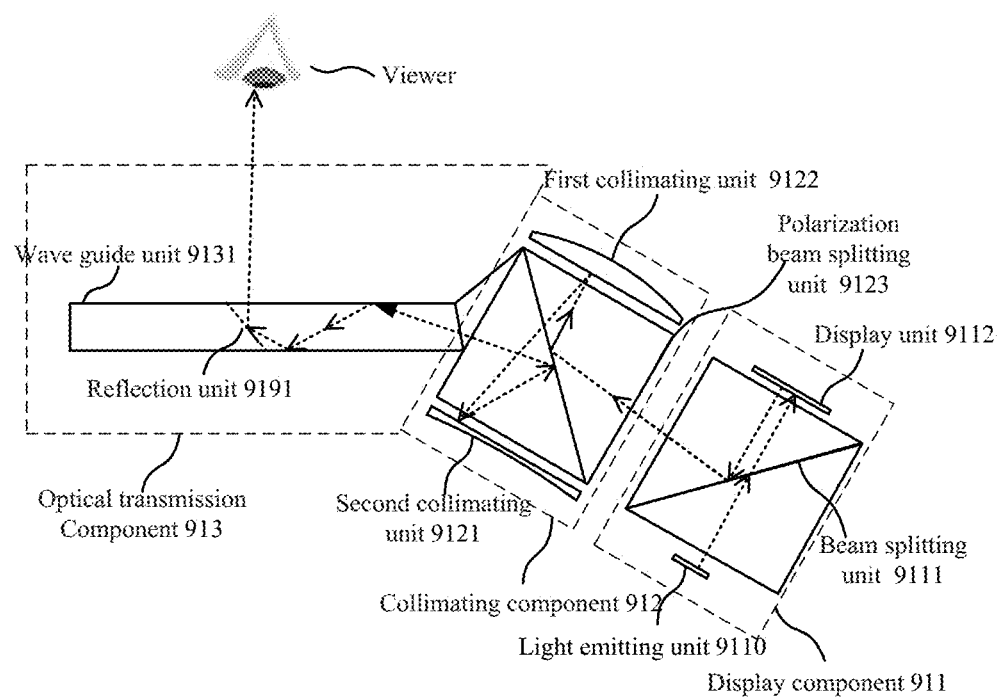
FIG. 10 is a second structural schematic diagram of the first display module according to an embodiment of the present application.

The first display module will be described in detail below. FIG. 9 is a first structural schematic diagram of the first display module according to an embodiment of the present application; and FIG. 10 is a second structural schematic diagram of the first display module according to an embodiment of the present application. The display component 911 includes a beam splitting unit 9111 and a display unit 9112, the collimating component 912 includes a second collimating unit 9121 and a first collimating unit 9122, and a polarization beam splitting unit 9123, the optical transmission component 913 includes a wave guide unit 9131 and a reflection unit 9132. The display component 911 further includes a light emitting unit 9110. The collimating component 912 processes and transforms the first beam projected and output in the mode of light beam into a second light beam to be output to the second optical transmission component 913.

In particular, the collimating component 912 includes a second collimating unit 9121 and a first collimating unit 9122, and a polarization beam splitting unit 9123 provided between the second collimating unit 9121 and the first collimating unit 9122, the first beam output from the display component is initially reflected by the polarization beam splitting unit 9123 to the first collimating unit 9122, and thereafter collimated by the first collimating unit 9122 and the second collimating unit 9121, and then passes through the polarization beam splitting unit 9123 to be exited as the second beam.

Here, the first collimating unit 9122 and the second collimating unit 9121 may be a single lens or a lens group as needed by design.

The optical transmission component 913 is configured to transmit the second beam in the material from which the optical transmission component is made, and finally transmit the same to the viewer; the optical transmission component 913 includes a waveguide unit 9131 and a reflection unit 9132, the coming second beam can be controlled by setting the position and angle of the reflection unit 9132 and guided to the specific position to be exited. In a first case, the collimating component 912 and the display component 911 are at a first side relative to a plane on which the wave guide unit 9131 is located, when the reflection unit 3132 is set, the second beam may be exited towards a second side relative to the plane on which the wave guide unit 9131 is located, the first side and the second side are opposite sides relative to the plane on which the wave guide unit 9131 is located.

Specifically, when the second display module is for example applied to a smart watch, the configuration example as described above may be adopted, so that the second beam is exited towards the second side, that is, the second beam is exited towards the eyes of the user wearing and viewing the strap-type electronic device. In further detail, it is possible to configure the exiting direction of the second display module according to viewing requirement, for instance, the reflection unit 9132 may be controlled to rotate, so as to control the exiting direction of the reflection unit 9132, thus achieving switch of bidirectional display of the second display module. In the embodiment of the present application, the reflection unit 9132 may be a single prism or a prism group as needed by design. In this way, the image perceived by the user is larger than the display output area.

Accordingly, by means of adopting the above solution, it is possible to determine that a distance between the object that operates the electronic device and the display unit is within a distance threshold with the first sensing parameter acquired through the first sensor, and in addition, it is also possible to determine that the object that operates the electronic device is the first operating body with the second sensing parameter acquired through the second sensor, and the display unit is lightened when the two conditions are both satisfied concurrently. In this way, the user can rapidly lighten the display unit and avoid an error operation, thereby operate the electronic device, which enhances using experience of the user.

By means of adopting the electronic device provided by the embodiments of the present application, when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner. More and richer second display content is displayed in the second display area of the display device as compared with the first display content displayed in the first display area, so that when the user views the second display output area in the second interaction manner, the information obtained through the second perceived image is more, richer, and more full-scale.

As will be appreciated by those skilled in the art, functions of respective processing units in the electronic device in the embodiments of the present application can be understood with reference to the related descriptions provided for the preceding information processing method, the respective units in the electronic device in the embodiments of the present application may be implemented by the functional analog circuits described in the embodiments of the present application, and may also be implemented by running of the software that executes the functions described in the embodiments of the present application on a smart terminal.

Those skilled in the art should understand that, the embodiments of the present disclosure can be provided as a method, a system or a computer program product. Therefore, the present disclosure can adopt forms of a full hardware embodiment, a full software embodiment, or an embodiment combining software and hardware aspects. And, the present disclosure can adopt forms of a computer program product implemented on one or more computer usable storage mediums (including, but not limited to, magnetic disk storage, CD-ROM, optical memory, or the like) including computer usable program codes.

The present disclosure is described by referring to flow charts and/or block diagrams of method, device and computer program product according to the embodiments of the present disclosure. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing device to generate a machine, so that a device for implementing functions specified in one or more flows of the flow charts and/or one or more blocks of the block diagrams is generated by the instructions executed by the processors of the computer or other programmable data processing device.

These computer program instructions can also be stored in computer readable storage which is able to direct the computer or other programmable data processing device to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing device, so that a series of operation steps are executed on the computer or other programmable device to generate computer implemented process, so that the instructions executed on the computer or other programmable device provide steps for implementing functions specified in one or more flows of the flow charts and/or one or more blocks of the block diagrams.

The above described are only preferable embodiments of the present application, they are not intended to limit the protection scope of the present application.

The invention claimed is:

1. An information processing method applied to a wearable electronic device that includes a first display module, the method comprising:

acquiring a first sensing parameter through a first sensor;

determining whether the first sensing parameter satisfies a first predetermined condition, the first predetermined condition being a distance threshold of a distance between an object that operates the electronic device and a display output area to which a display unit of the first display module of the electronic device corresponds, so as to determine that the object before the display output area is a user's eye as a first operating body;

generating a first control instruction when the first sensing parameter satisfies the first predetermined condition;

controlling the first display module to switch from a first state to a second state based on the first control instruction, wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state, wherein the method further comprises:

acquiring a second sensing parameter through a second sensor;

determining whether the second sensing parameter satisfies a second predetermined condition, wherein the acquiring a second sensing parameter through a second sensor comprises acquiring a motion parameter of the second operating body that wears or holds the electronic device through the second sensor as the second sensing parameter; and correspondingly, determining whether the second sensing parameter satisfies a second predetermined condition based on the second sensing parameter comprises: determining the object in front of the display output area as the first operating body when the motion parameter of the second operating body represents that the second operating body moves from a first relative position to a second relative position, wherein determining the object in front of the display output area as the first operating body when the motion parameter of the second operating body represents that the second operating body moves from a first relative position to a second relative position comprises initiating the first sensor when the motion parameter of the second operating body represents that the second operating body moves from a first relative position to a second relative position, and determining the object in front of the display output area as the first operating body when the first sensing parameter is sensed through the first sensor.

2. The method according to claim 1, wherein
the second predetermined condition is whether the object that operates on the display output area to which the display unit corresponds belongs to a first operating body;

wherein the generating a first control instruction when the first sensing parameter satisfies the first predetermined condition comprises generating a first control instruction when the first sensing parameter satisfies the first predetermined condition and the second sensing parameter satisfies the second predetermined condition.

3. The method according to claim 2, wherein:
the second sensor is a sensor for sensing gesture, and is configured to acquire a motion of a second operating body that wears or holds the electronic device.

4. The method according to claim 2, wherein the method further comprises:
generating a startup instruction when the first display module is in the displaying-operating state;
controlling the display unit of the first display module to be lit based on the startup instruction, wherein a light beam emitted by the display unit transmits through the display output area and is incident to eyes of a user, which serves as the first operating body, so that the user sees a magnified picture.

5. The method according to claim 4, wherein:
the electronic device further includes a second display module, display principle of the second display module is different than a display principle of the first display module;
the second display module includes a first operating state and a second operating state; wherein the first operating state is a low-power-consumption state of the second display module, at least a display unit of the second display module is not lit when the second display module is in the low-power-consumption state, the second operating state is a displaying-operating state of the second display module, the display unit of the second display module is lit when the second display module is in the displaying-operating state;

wherein the controlling the first display module to switch from a first state to a second state based on the first control instruction comprises controlling the first display module to switch from the first state to the second state based on the first control instruction, while controlling the second display module to switch from the second operating state to the first operating state.

6. The method according to claim 1, wherein:
the first predetermined condition is a distance interval of a distance between an object that operates the electronic device and a display output area to which a display unit of the first display module of the electronic device corresponds, the distance interval including a first distance threshold at a start position of the distance interval and a second distance threshold at an end position of the distance interval, the first distance threshold being smaller than the second distance threshold;
a sensing range of the first sensor is a first distance value that includes the distance interval;
wherein the determining whether the first sensing parameter satisfies a first predetermined condition comprises:
generating a first control instruction when the first sensing parameter is within the distance interval so as to control the first display module to switch from the first state to the second state;
controlling the first display module to maintain in the first state when the first sensing parameter is smaller than the first distance threshold;
controlling the first display module to maintain in the first state when the first sensing parameter is greater than the second distance threshold.

7. A wearable electronic device, comprising
a first sensor configured to acquire a first sensing parameter;
an information processing unit configured to determine whether the first sensing parameter satisfies a first predetermined condition, the first predetermined condition being a distance threshold of a distance between an object that operates the electronic device and a display output area to which a display unit of the first display module of the electronic device corresponds, so as to determine that the object before the display output area is a user's eye as a first operating body; and to generate a first control instruction when the first sensing parameter satisfies the first predetermined condition; and control the first display module to switch from a first state to a second state based on the first control instruction
wherein the first state is a low-power-consumption state of the first display module, at least the display unit of the first display module is not lightened when the first display module is in the low-power-consumption state, the second state is a displaying-operating state of the first display module, the display unit of the first display module is lightened when the first display module is in the displaying-operating state,
wherein, a second sensor is configured to acquire a second sensing parameter; and correspondingly, the information processing unit is further configured to determine whether the second sensing parameter satisfies a second predetermined condition, the second sensor is configured to acquire a motion of a second operating body that wears or holds the electronic device, and to acquire a motion parameter of the second operating body that wears or holds the electronic device through the second sensor as the second sensing parameter; and corresponding, the information processing unit is configured to determine the object in front of the display output area as the first operating body when the motion parameter of the second operating body represents that the second operating body moves from a first relative position to a second relative position, the information processing unit is configured to initiate the first sensor when the motion parameter of the second operating body represents that the second operating body moves from a first relative position to a second relative position, and to determine the object in front of the display output area as the first operating body when the first sensing parameter is sensed through the first sensor.

8. The electronic device according to claim 7, wherein the second predetermined condition is whether the object that operates on the display output area to which the display unit corresponds belongs to a first operating body; and the information processing unit is further configured to generate a first control instruction when the first sensing parameter satisfies the first predetermined condition and the second sensing parameter satisfies the second predetermined condition.

9. The electronic device according to claim 8, further comprising a frame body, a fixing device, and a functional main section;

the fixing device is connected with the frame body and is configured to fix the electronic device to a support body, such that the frame body and the fixing device form an annular space when the electronic device is fixed to the support body by the fixing device;

the functional main section includes a display device provided within the frame body and has a first display area and a second display area;

wherein the display device includes a first display module configured to form a display output area corresponding to the display area on an outer surface of the frame body when content is displayed in the display area, and to generate a startup instruction when the first display module is in the displaying-operating state;

wherein the information processing unit is further configured to control the display unit of the first display module to be lit based on the startup instruction, such that a light beam emitted by the display unit transmits through the display output area and is incident to eyes of a user, which serves as the first operating body, so that the user sees a magnified picture.

10. The electronic device according to claim 9, wherein: the electronic device further includes a second display module, display principle of the second display module is different than that of the first display module; the second display module includes a first operating state and a second operating state; wherein the first operating state is a low-power-consumption state of the second display module, at least a display unit of the second display module is not lit when the second display module is in the low-power-consumption state, the second operating state is a displaying-operating state of the second display module, the display unit of the second display module is lit when the second display module is in the displaying-operating state;

wherein the information processing unit is further configured to control the first display module to switch from the first state to the second state based on the first control instruction, while controlling the second display module to switch from the second operating state to the first operating state.

11. The electronic device according to claim 8, wherein the second sensor is a sensor for sensing gesture.

12. The electronic device according to claim 7, wherein: the first predetermined condition is a distance interval of a distance between an object that operates the electronic device and a display output area to which a display unit of the first display module of the electronic device corresponds, the distance interval including a first distance threshold at a start position of the distance interval and a second distance threshold at an end position of the distance interval, the first distance threshold being smaller than the second distance threshold; a sensing range of the first sensor is a first distance value that includes the distance interval;

the information processing unit is further configured to generate a first control instruction when the first sensing parameter is within the distance interval so as to control the first display module to switch from a first state to a second state; to control the first display module to maintain in the first state when the first sensing parameter is smaller than the first distance threshold; and to control the first display module to maintain in the first state when the first sensing parameter is greater than the second distance threshold.

* * * * *